Inventor:
Joseph André Hug
BY Baldwin & Wight
Attorneys

Inventor:
Joseph Andre Hug
By Baldwin & Wight
Attorneys

Inventor:
Joseph Andre Hug
BY Baldwin & Wight
Attorneys

Inventor:
Joseph Andre Hug
BY Baldwin & Wight
Attorneys

United States Patent Office 3,441,915
Patented Apr. 29, 1969

3,441,915
SUPERCONDUCTIVE DATA STORAGE DEVICE
Joseph André Hug, Ormesson-sur-Marne, France, assignor to Societe Industrielle Bull-General Electric (Societe Anonyme), Paris, France
Filed Apr. 15, 1966, Ser. No. 542,932
Claims priority, application France, Apr. 22, 1965, 14,182
Int. Cl. G11b 9/00
U.S. Cl. 340—173.1 2 Claims This invention relates to data storage devices in which the data are written in the form of persistent currents in a superconducting film.

Figure 1:
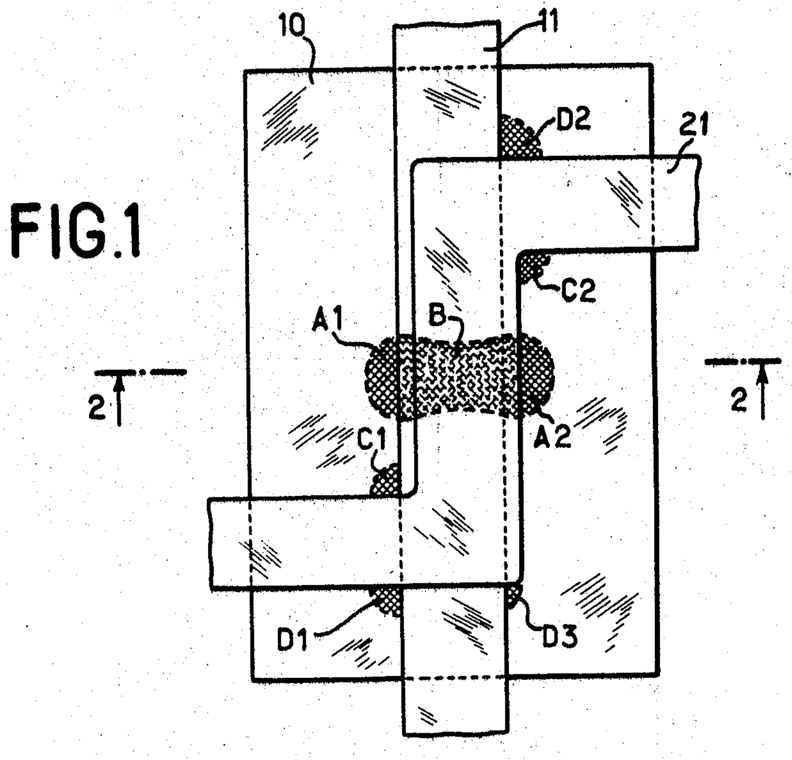

The invention relates more particularly to devices of this type which comprise storage elements disposed in the form of a matrix and in which a storage element is selected by means of control currents coincidentally applied along the storage element.

When currents are applied to control conductors extending along the superconducting film, induced currents of opposite direction are set up on the surface of the latter, and when the density of the currents induced in the superconducting film locally reaches a particular critical value, a small zone of this film changes to the resistive state at the point under consideration.

The formation of resistive zones results in a local dissipation of energy and a modification of the state of equilibrium of the currents induced in the superconducting film.

The characteristic phenomena of the writing and reading of data in devices of the type under consideration result from the creation of such resistive zones in well-determined regions of the superconducting film, and it has been discovered that certain disturbances which are likely to result in the loss of recorded data are due to the appearance of resistive zones in certain other regions of the superconducting film which are separate from those first mentioned.

Now, the appearance of resistive zones in the superconducting film depends upon the distribution of the currents induced in this film, and this distribution of currents is closely related to the configuration of the control conductors. It has been discovered more particularly that the density of the currents induced in the superconducting film along one edge of a control conductor forming a curve is higher in proportion as the radius of curvature of the curve is smaller.

It has also been found that a plurality of superimposed conductors act on the distribution of the induced currents in the same way as a single conductor whose contour is the envelope of the projection of these conductors on to the superconducting film, and it has been discovered that the density of the currents induced in the superconducting film in the neighbourhood of the apex of the angle between the edges of two superimposed control conductors is higher in proportion as the angle is smaller.

A storage device comprising a superconducting film according to the invention is characterised in that the radius of curvature of the curve formed by the edge of a control conductor or the angle between the edges of two superimposed control conductors, along a region of the superconducting film in which a return to the resistive state might disturb the operation of the device, is sufficiently large to prevent such a transition during the passage of a control current through the control conductor, through one of the two superimposed control conductors, or through both simultaneously.

The invention is applicable with advantage to storage matrices comprising a continuous superconducting film common to all the storage elements, and makes it possible to increase the operating reliability and, where necessary, to reduce the difficulties in the construction of the storage matrices.

Figure 2:
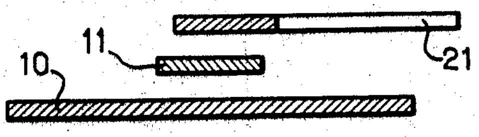
Figure 5:
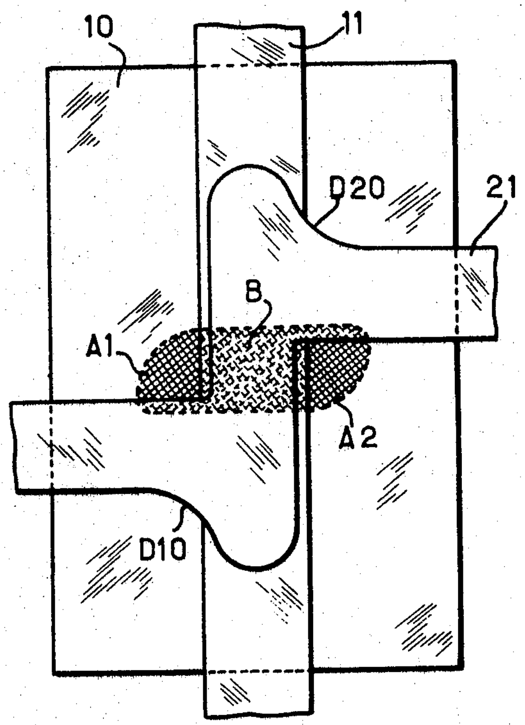
Figure 6:
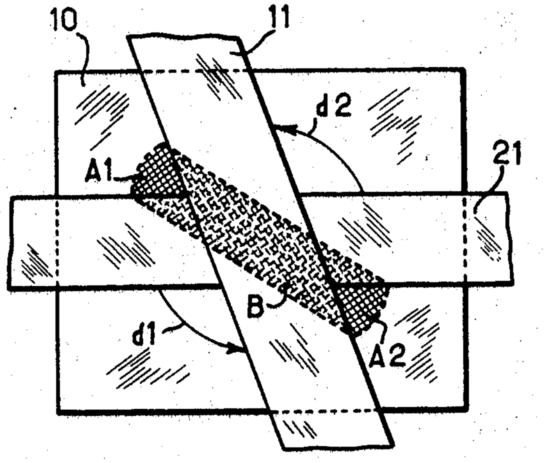
Figure 7:
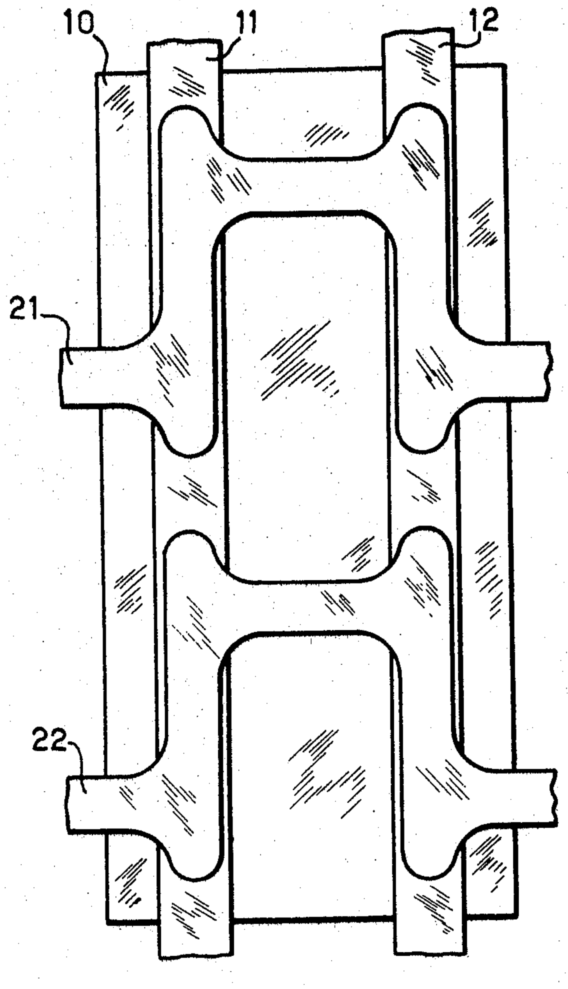

For a better understanding of the invention and to show how it may be carried into effect, the same will now be described, by way of example, with reference to the accompanying drawings, in which:

FIGURE 1 is a plan view of a persistent-current storage element of a type to which the present invention is applicable, FIGURE 2 is a section along 2—2 of FIGURE 1, FIGURES 3 to 6 are plan views, respectively, of a first, a second, a third and a fourth storage element according to the invention, and FIGURE 7 is a plan view of a storage matrix according to the invention.

The storage element illustrated in FIGURES 1 and 2 comprises a continuous sheet 10 consisting of a superconductive substance having a low critical field, such as tin or indium. This sheet will be termed the "superconducting film" throughout the remainder of the description. The storage element comprises, in addition, ribbon-form control conductors 11 and 21 disposed on one of the faces of the superconducting film 10. These conductors are made of a superconductive substance such as lead, which has a relatively high critical field.

In FIGURE 1, the cross-lined areas A1, A2, B, C1, C2, D1, D2 and D3 represent zones of the superconducting film 10 which become resistive, or which are capable of becoming resistive, during the operation of the storage element.

A binary datum element is represented in the storage element in the form of persistent currents flowing in a particular direction through the superconducting film 10 around the resistive zones A1, A2, each of which extends from one face to the other of the superconducting film, and through which there exists a magnetic flux due to the said persistent currents.

The reversal of the direction of the persistent currents for the purpose of substituting one of the binary digits for the other in the storage element pre-supposes the momentary appearance between the resistive zones A1 and A2, of an intermediate resistive zone B which combines the two zones A1 and A2 into one.

During the operation of the storage element just described, whether this be during the passage of a current of normal value through each of the control conductors for controlling the storage element, or during the passage of a current having the same normal value through only one of these control conductors, resistive zones may appear in those regions of the superconducting film which are separate from those in which the zones A1, A2 and B are situated. This is the case, for example, with the zones C1, D1, D2 and D3 which are situated along the angles between the edges of the control conductors 11 and 21. It is also the case with the zone C2 situated along a curve of small radius of curvature formed by the edge of the control conductor 21. The appearance of such zones is likely to cause disturbances in the operation of the storage element.

FIGURES 3 to 6 illustrate by way of non-limiting examples various constructional forms of superconductor storage elements embodying the present invention. In these figures, the elements corresponding to those illustrated in the preceding figures are denoted by the same references.

Figure 3:
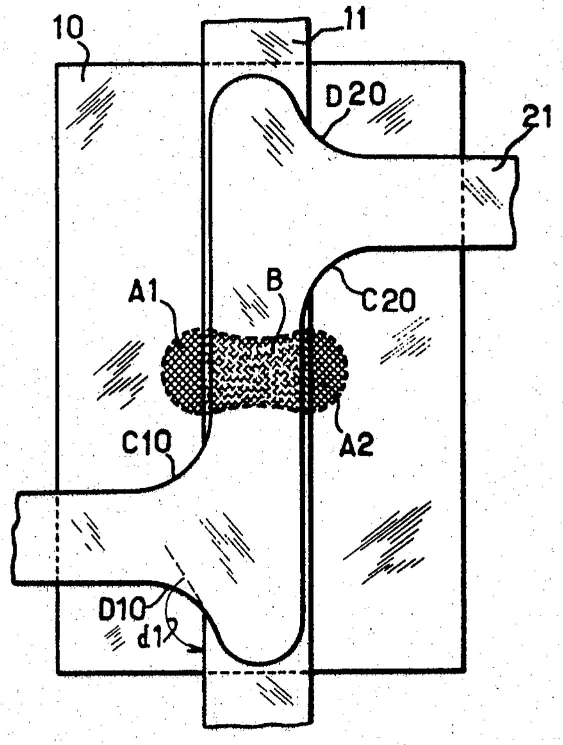

The curves C10, C20, D10 and D20 formed by the edges of the control conductors 11 and 21 of the storage element illustrated in FIGURE 3 each have a relatively large radius of curvature. This radius must be sufficiently large, for example more than $1/10$ of the width of the conductor, to avoid the formation of resistance zones in the adjacent region of the superconducting film during the passage of a control current of normal value through either one of the control conductors or through both of these conductors. In addition, if the angle, for example the angle *d*1, between those portions of the edges of the control conductors whose projections on to the superconducting film intersect one another is considered, it will be seen that the configuration of the conductors has been so chosen that this angle is sufficiently large to avoid the formation of resistive zones in the superconductor in the neighborhood of the apex of this angle during the passage of a control current of normal value through one of these conductors or through both.

The cross-lined areas A1, A2 and B represent the resistive zones formed in the superconducting film in the course of the operation of the storage element, in the same way as in the storage element illustrated in FIGURE 1.

Figure 4:
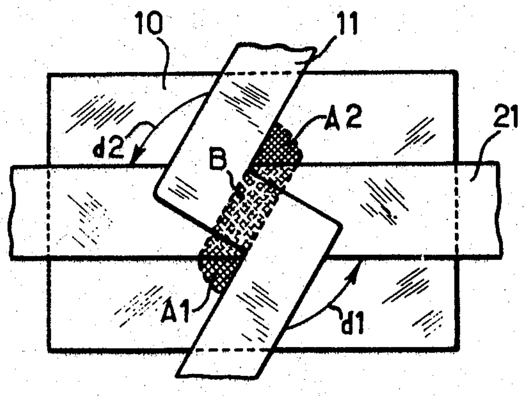

The angles *d*1 and *d*2 between the edges of the control conductors 11 and 21 of the storage element illustrated in FIGURE 4 are each sufficiently large to avoid the formation of resistive zones in that region of the superconducting film which is adjacent to their apex during the passage of a control current of normal value through either one of the control conductors or through both.

The interpretation of FIGURES 5 and 6 requires no comment.

Storage elements having the aforesaid features may be employed to construct storage matrices according to the invention.

FIGURE 7 illustrates by way of example a storage matrix according to the invention in which the recording medium is a continuous superconducting film 10 common to all the storage elements, and in which the control conductors 11, 12, 21 and 22 have a configuration suitable for the construction of storage elements of the type illustrated in FIGURE 3 with the superconducting film 10.

What is claimed is:

1. A data storage device having at least one data storage element and comprising a data storage medium in the form of a sheet of superconducting material, and control conductors in the form of ribbon-like strips of superconducting material for controlling a data storage element of said device, each of said control conductors lying in a plane parallel to the plane of said sheet, these control conductors being so formed and arranged that pre-determined areas of said sheet become resistive under the action of coincident control currents flowing through said control conductors, in order to store a datum in said data storage element, the flow of control current through either one or more of said control conductors causing the setting up of a resistive zone in an area of said sheet along which the edge of said control conductor forms a curve having a radius inferior to a given radius value, and in an area along which the edge of said control conductor forms with an edge of another control conductor an angle inferior to a given angle value, said data storage device being characterized in that the value of the radius of any curve and the value of any angle thus formed along an area of said sheet other than said predetermined areas, are respectively larger than said given radius value and said given angle value.

2. A superconductor memory matrix comprising a data storage medium in the form of a continuous sheet of superconducting material, and two sets of control conductors in the form of ribbon-like strips of superconducting material, said two sets of control conductors being respectively associated with the rows and the columns of the matrix and lying respectively in a first and in a second plane parallel to the plane of said sheet and on the same side thereof, these control conductors being so formed and arranged that predetermined areas of said sheet become resistive under the action of coincident control current flowing through pairs of control conductors pertaining to different one of said sets, in order to store data in said memory matrix, the radius of any curve formed by the edge of any of said control conductors, and any angle formed by any two crossing edges of said control conductors along an area of said sheet other than said predetermined areas, having a value higher than that under which the flow of control current through either one or more of said control conductors would cause the setting up of a resistive zone in such an area.

References Cited

UNITED STATES PATENTS

| | | | |
|---|---|---|---|
| 3,263,220 | 7/1966 | Crowe | 340—173.1 |
| 3,264,617 | 8/1966 | Feissel | 340—173.1 |
| 3,289,182 | 11/1966 | Suits | 340—174 |

BERNARD KONICK, *Primary Examiner.*

JOSEPH F. BREIMAYER, *Assistant Examiner.*